Aug. 10, 1965  T. E. CALIM  3,199,829
MOLDING APPARATUS
Filed July 13, 1962
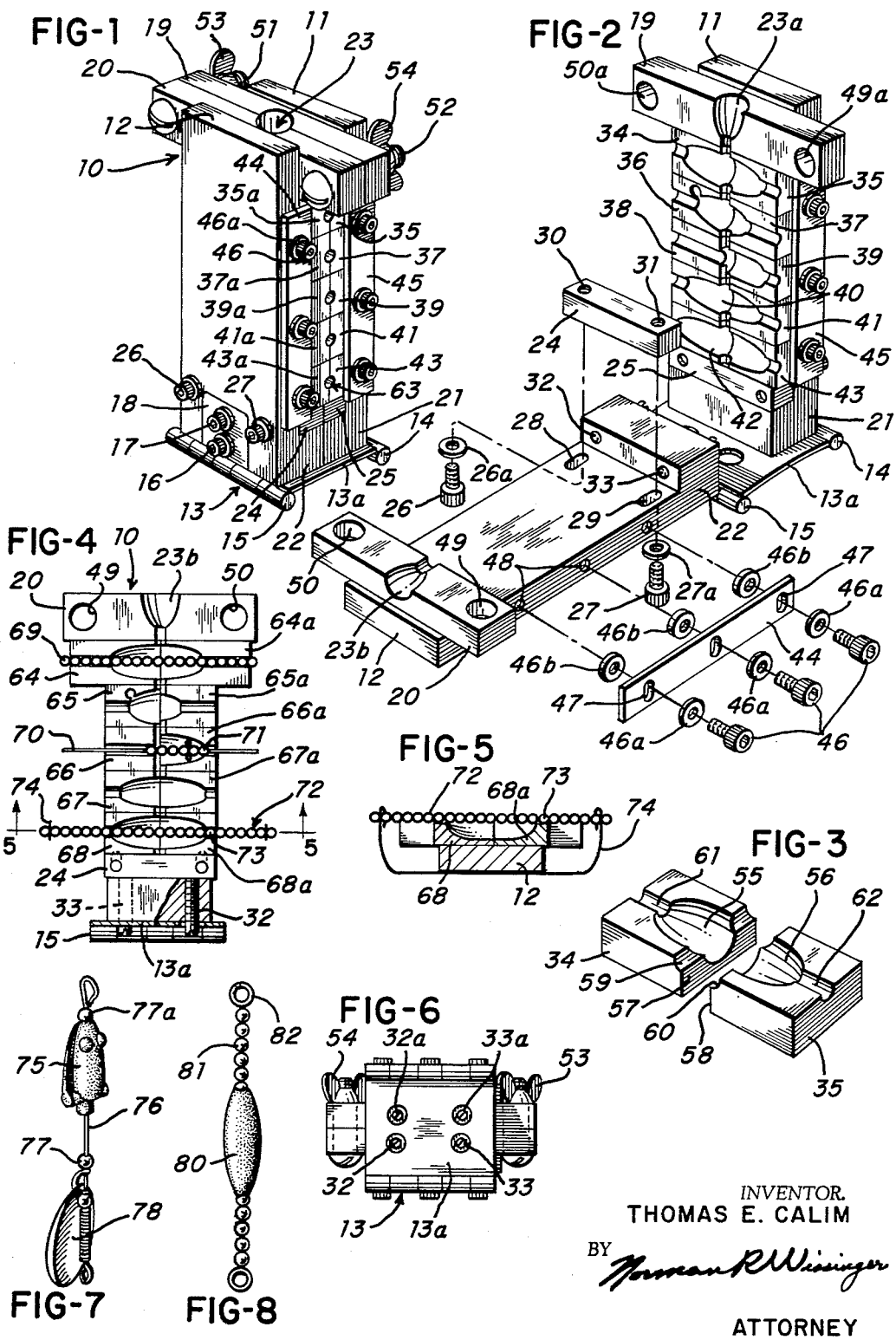
INVENTOR.
THOMAS E. CALIM
BY Norman R. Wissinger
ATTORNEY United States Patent Office 3,199,829
Patented Aug. 10, 1965

3,199,829
MOLDING APPARATUS
Thomas E. Calim, 5420 Patterson Road, Dayton 30, Ohio
Filed July 13, 1962, Ser. No. 209,537
17 Claims. (Cl. 249—94)

The invention here is in the field of molding and relates particularly to an apparatus which is readily adaptable to molding a variety of differently shaped small objects such as fishing weights and lures.

In the past, the sport of fishing and the art of molding have come together in the form of a variety of small, manually-operated molding devices by means of which the more ardent fisherman could, upon the acquisition and melting of a small supply of lead or solder, form his own sinkers such as are commonly associated with the business end of a fishing line. Because such devices have been intended for use by persons who might be considered molding amateurs, they have been of a basic construction, usually of a two-piece construction wherein the opposed cavity-forming plates have been hinged or otherwise interconected so that they might be closed in cavity-forming relationship to receive the molten material. These prior art molds could produce one fixed article or a fixed series of articles such as very simply contoured sinkers. On the other hand and notwithstanding their ineptitude at molding, there has long been a desire on the part of fishermen to bring their own creative personalities into their fish luring and landing machinations. Fishermen delight for example in designing their own elaborate lures or artificial baits in a variety of shapes that are thought to have special fish appeal. Unfortunately, this natural bent toward creativity has been stymied by the foregoing limitations on the molding techniques and apparatuses available.

But all of the above is not to say that the molding art, even in other fields, has supplied a convenient universal mold amenable by easily manipulated modifications to suppying a variety of differently shaped products. Perhaps this has been because the economics of professional molding are such that quantity production has eliminated any need for deriving more than one shape from a particular mold; but more probably, the requirement for ruggedness on the one hand and for precision from the standpoint of registry of the cavity-forming members and the like on the other hand has forestalled the development of a universal mold.

It is accordingly an object of the present invention to provide a universal molding apparatus which, by means of simple manipulation, may be repeatedly altered to produce a wide variety of differently shaped articles.

It is a further object of the present invention to provide a mold which, notwithstanding its ease of alteration, is capable of producing precisely molded articles.

It is yet another object of the present invention to provide such a molding apparatus, the cavity-forming components of which may be constructed or rearranged to provide products in response to the creative impulses of the molder.

To achieve these and other objects and advantages apparent from the following disclosure, this invention provides a book mold comprising leaf-type frame members associated by a hinge allowing them to be opened and closed in book fashion wherein the opposed surfaces of the frame when they are in closed position are characterized by inwardly projecting ribs or lugs integrated therewith at spaced points along the length thereof, which ribs or lugs are in abutting relationship when the mold is in closed position. Associated with the frame members by insertion against the inner faces thereof between the spaced lugs are one or more interchangeable segments or cavity-forming inserts, the outside dimensions of which are such that, in the aggregate, they completely span the distance between said lugs and are thereby held in fixed position. The lugs at one of the ends of the frame members are appropriately grooved to form when these lugs are in contacting position an opening through which molten metal may be poured; and the individual mold inserts are such that when those on one of the frame members are in contact with those on the other, they provide a continuous channel through all of the cavities formed by said inserts and communicating with said opening in the lugs. Releasable means for fastening the frame members together during the pouring and setting of the molten material are provided; and, in one modification of the present invention, means are associated with the hinge component to give impetus to the subsequent opening of the mold after the said fastening means have been released.

In still a further modification of the present invention, the cavity-forming mold insert blocks are such that when they are positioned against the interior surface of the respective frame members and are in registered contact with their opposite numbers on the other frame member, they will provide one or more mold cavities having openings to one or more of the sides of the book formed by the closed assembly which openings are of such a diameter that they may be plugged by small beads which form a part of or are associated with the molded products to be hereinafter described.

In still another modification of the present invention adjustable spacing and aligning means associated with one of the fixed ribs on said frames are provided to insure the establishment and maintenance of the proper positon of the cavity-forming members on the respective frames; and means may also be associated with the edge of one or more of the frames for insuring the establishment and maintenance of the proper alignment of the cavity inserts longitudinally of the frame members. Particularly where such adjustment and aligning means are provided, the cavity-forming units employed may be quarter segments; i.e., each segment provides a groove or depression forming only one-fourth of the ultimately desired cavity. Such quarter segments are then placed in the mold so that two of the same in endwise abutting relationship are associated with each of the frame members in such a position that upon closure of the mold the cavity depressions on one of the frames will register with the companion cavity portions on the other. Such a four-part cavity assembly is made possible in the case of the present invention by the uniform rectangularity of each of the segments and the manner in which they are held in their desired relationship with the mold frame and the other cavity members. Because of the interchangeability of these quarter segments, each may be used in combination with three of any other of a wide variety of such segments to provide a seemingly interminable variety of shapes from a given collection of say twenty of such blocks.

The invention thus generally described may be more clearly understood by reference to the following detailed description of certain preferred embodiments thereof in connection with which reference may be had to the appended drawings.

In the drawings:

FIGURE 1 is a perspective view of a closed book-type mold according to the present invention.

FIGURE 2 is a partially exploded perspective view of the mold illustrated in FIGURE 1 shown in open condition.

FIGURE 3 is an enlarged perspective view of two of the quarter segment cavity-forming members of the mold assembly illustrated in FIGURES 1 and 2.

FIGURE 4 is a plan view, partially broken away and in partial cross section, of a portion of the mold illustrated in FIGURES 1 and 2 showing a different arrangement of components in connection therewith.

FIGURE 5 is an elevational view in partial cross section taken on the line 5—5 of FIGURE 4.

FIGURE 6 is an end view of the base of the mold of FIGURE 1.

FIGURE 7 is a perspective view of a molded product of a mold assembly acording to the present invention.

FIGURE 8 is a perspective view of another molded product of a mold assembly according to the present invention.

Referring now to FIGURES 1 and 2, one form of mold 10 according to the present invention is shown to comprise the leaf-like frame members 11 and 12, the lower ends of which are mounted upon the hinge 13 comprising the hinge plate 13a and the hinge pins 14 and 15 by means of which hinge ears such as 18 are pivotally associated with the plate 13a. Both frame members 11 and 12 may be associated with the hinge and more specifically with the respective hinge pins 14 and 15 as shown by the attachment of the ear 18 to the frame 12 by the threaded fasteners 16 and 17. It will be understood that the nature of the hinge and the manner of the association of the frame members therewith is such that the assembly may be closed as shown in FIGURE 1 or opened as shown in FIGURE 2, as a result of which it might be referred to as a book-type mold.

Permanently affixed to or integrally formed with the frame members 11 and 12 at the inner faces near the ends thereof opposite those at which they are affixed to the hinge are the ribs or lugs 19 and 20 hereinafter referred to as the pouring blocks. Integrally formed with or otherwise permanently associated with the inner faces of the frame members 11 and 12 at the ends thereof adjacent the point of affixation to the hinge are similarly inwardly projecting ribs or lugs 21 and 22, hereinafter referred to as hinge blocks. As will be observed, the size and relative positons of the pouring blocks 19 and 20 and the hinge blocks 21 and 22 are such that, when the mold is in the closed positon shown in FIGURE 1, the innermost broadside surfaces of these blocks will be in abutting relationship so as to act as spacers for the inner surfaces of the frames 11 and 12. Referring again to the pouring blocks 19 and 20, it will be observed that they are further characterized on their inner surfaces and substantially centrally thereof by depressions or grooves 23a and 23b which, upon closure of the mold as shown in FIGURE 1, form a channel 23 through and transversely of the contacting pouring blocks.

In one particular modification of the present invention, the assembly thus described may be further characterized by the association with the hinge blocks of adjustment bars 24 and 25 which, as best shown in FIGURE 2, are so associated by the threaded fasteners 26 and 27 passing through oblong openings 28 and 29 in the frame member near the hinge block and into threaded openings 30 and 31 in the adjustment bar. The nature of this particular association is such that, even though tightening of the fasteners 26 and 27 holds the ajustment bar 24 firmly against the inner face of the frame 12, the bar, by virtue of the elongation of the openings 28 and 29, may slide longitudinally of the frame member 12 toward or away from the hinge block 22. This sliding movement is aided by the provision of the slip washers 26a and 27a positioned between the heads of the fastening members 26 and 27 and the outside surface of the frame 12. Further controlling the position and adjustment of the bar 24 relative to the hinge block are the adjustment screws 32 and 33 threadably engaging and passing through the hinge block 22 longitudinally of the frame member.

It will be observed that the assembly thus far described, either with or without the interposition of the adjustment bars 24 and 25 is a unitary closable construction inwardly of which is a space defined by the opposed inner surfaces of the frame members 11 and 12, the lower surfaces of the abutting pouring blocks 19 and 20 and the upper surfaces of the hinge blocks 21 and 22 or of the adjustment bars 24 and 25. At the same time, this space is open at the ends adjacent the edges of the frame members 11 and 12. The dimensions of this space longitudinally of the frame members 11 and 12 are such that one or a series of cavity forming or spacing inserts such as 34 and 35 may be firmly held in side-by-side abutting relationship by virtue of being snugly fitted between the hinge blocks and pouring blocks of the respective frame members.

A comparison of FIGURES 1, 2, and 3 will show that a complete mold cavity is formed by four of the individual inserts such as 34, 35, 35a and another (not shown) two of which are in end-to-end contact and bear against the inner face of the frame member 11 and two of which in similar contact bear against the inner face of the frame member 12. Upon the closure of the frame members the inner faces of the inserts will be in abutting relationship and completely enclose a cavity, the shape of which will depend upon such depressions 55 and 56 as are originally formed on the molding surfaces of the inserts such as 34 and 35 respectively. Referring again to FIGURE 2 it will be observed that the additional insert blocks 36, 37, 37a, 38, 39, 39a, 40, 41, 41a, 42, 43, and 43a all have differently shaped cavities therein. Because the cross sectional dimensions of all of these blocks are the same, they are interchangeable not only with relation to the frame member and its appendages but also with respect to each other so that the block 36 for example may be associated with the block 41 (being simultaneously matched by mating blocks on the opposite frame member) to provide an entirely different shape from that which either of these blocks would make if combined with another block.

Where, as will often be the case, all of the insert blocks, in addition to being of the same cross sectional dimension are also of the same length, the precision of the alignment of the blocks may be aided by the abutment member 44 which, as best shown in FIGURE 2, is associated with one of the edges of each of the frame members 11 and 12 by one or more threaded fasteners 46 passing through the slide washer 46a, an elongated opening 47 in the abutment member, the slide washer 46b and into threaded engagement with a threaded opening 48 in the edge of the frame member 12. The elongation of the openings 47 being transversely of the alignment strip 44, is such that the strip may be slid upwardly to project above the edge of the frame member 12 and provide an abutment surface against which all of the mold blocks adjacent such edge may be aligned and held in proper position. Where, as will be hereinafter explained, it is desired that differing lengths of insert blocks be used simultaneously with the assembly or where any of the blocks is longer than the width of the frame member the abutment strip 44 may be dropped out of operable position by simply loosening the screws 46 and pushing the strip downwardly. A similar alignment strip 45 may be associated in like manner with the frame member 11 as illustrated in FIGURE 1.

Once the molding apparatus has been assembled as above, and all of suitably chosen molding blocks have been inserted therein, the mold may then be closed to the position shown in FIGURE 1 at which time the registered contact between the pouring blocks 19 and 20 will cause a similar registry of the bores 49, 49a 50 and 50a to provide openings through which the threaded fasteners such as 51 and 52 may be passed and associated with suitable nuts such as the wing nuts 53 and 54 to clamp and hold the mold assembly together. At this point, the hinge 13 will act as a base or pedestal upon which the closed mold may be stood in an upright position presenting upon its upper surface the opening 23 communicating with the space defined by the mold assembly interiorly thereof so as to allow the pouring into such space (now occupied of course by the cavity-forming blocks such as 34 and 35) of a molten metal such as lead, tin or solder.

Further in connection with the pouring and flow of the molten material and this time referring again to FIGURE 3, it will be observed that each of the quarter inserts 34 and 35 is characterized by a quarter-round groove such as 59 and 60 with the result that, upon the end-to-end abutment of the faces 57 and 58, a half-round groove or trough will be formed tranversely of the cavity from one edge thereof to the other. As shown in FIGURE 2, these transverse grooves are aligned from one cavity unit to another and, when joined in registry with the half-round groove presented by the companion segments on the other frame member, define a continuous channel or sprue interconnecting all of the cavities. Accordingly, no matter what the arrangement of cavity blocks according to the creative desires of the fisherman or molder, complete filling of all of the cavities associated with the assembly is assured. In those cases where the molder may wish to mold in only one or two cavities, this intercommunicating channel may be easily stopped by the simple expedient of inverting the four-quarter segments adjoining those quarter segments which are defining the lowest of the cavities to be filled with molding material; i.e., by changing the inserts so that the cavity-forming depressions and the quarter-round grooves therein are adjacent the inner face of the frame members rather than with each other.

The mold blocks 34 and 35 are further characterized by longitudinally extending half-round grooves 61 and 62 communicating with the mold cavity and opening upon the ends of the mold blocks as they will comprise the total cavity unit so that, upon closure of the mold as shown in FIGURE 1 there will be a closed channel extending longitudinally of the mold blocks from one edge of the booktype frame assembly to the other. These channels, which will be further discussed below, provide an additional convenience in the proper alignment of all of the cavity blocks as to any one cavity in that a wire or rod may be inserted through the channel formed by these grooves such as 61 and 62. Where this rod is of an outside diameter substantially equal to the inside diameter of the channel, it will cause all four of the individual cavity units associated with a single channel to become properly indexed and arranged prior to the final tightening of the assembly.

One of the less direct but nonetheless important advantages of mold insert blocks of the type illustrated in FIGURE 3 is that they may be completely formed, including the original creation of the cavity-defining contours therein, by simple machining processes such as can be performed for example on an automatic screw machine, at a very low cost as compared with the elaborate pattern and core making procedures that are involved in conventional casting operations. In the case of automatic screw machine production, the desirablity of uniform cross sectional dimension as to all of the segments becomes an aid in that it enables the manufacture of thousands of such inserts from conventional bar stock of aluminum or other metal from which the inserts are to be formed. Where the cavity-forming members are in segments of the type herein considered, they may as a matter of fact be produced simultaneously in pairs by the simultaneous passage of two bars of the metal stock through the screw machine which, immediately subsequent to the machining of the cavity contour, will automatically cut the bar to the desired lengths.

Referring now to FIGURE 4, the frame member 12 is shown to include a slightly different arrangement of mold inserts 64, 64a, 65, 65a, 66, 66a, 67, 67a, 68 and 68a. Once again it will be observed that the lateral dimensions of the individual inserts are such that when they are all placed in side-by-side relation, they completely span the distance between the lower face of the pouring block 20 and the opposed upper face of the adjustment bar 24 and are held in their desired position by forced contact with the frame member and with each other. Taking advantage of the fact that the frame is open along both of its edges, the mold blocks 64 and 64a and their companion blocks having identical cavity configurations and associated with the other frame member adjacent its pouring block are longer than the rest of the blocks and may indeed be as long as the requirements of the length of the cavity might demand. Where the article to be molded in the cavity formed by the blocks 64, 64a and their companion blocks is to be a sinker having a bead chain extending therethrough as shown in FIGURE 8, the bead chain may be associated with the molded article by placing it in the channel extending longitudinally of the four-unit cavity assembly prior to the introduction of the molding material. Where the outside diameter of the beads 69 is substantially equal to the inside diameter of the longitudinal channel such as would be formed by the grooves 61 and 62 in FIGURE 3, the chain functions during the molding process to prevent the escape of the molten material through the longitudinal channel.

A somewhat similar function is achieved in connection with the mold blocks 66 and 66a wherein a wire 70 extends through the longitudinal channel and has associated therewith a shorter bead chain 71, one end of which is positioned adjacent the groove forming the right end of the longitudinal channel and one end of which completely closes the channel which is the only cavity depression in the mold block 66. Since the endmost beads of this chain extend beyond the points at which the cavity proper is closed by the other beads, these end beads will appear outside of the molded unit in the finished product as shown in FIGURE 7. In connection with these particular blocks the alignment feature of the longitudinal channel can be observed in that the rod 70 holds the beads in alignment and the beads in turn, by fitting snugly in the channel, cause all four of the blocks forming the channel to be properly positioned. In cases where it is important that the chain be taut throughout the molded product, an arrangement such as that shown in FIGURES 4 and 5 in connection with the cavity inserts 68 and 68a may be employed, wherein the chain 72 is held at its ends exteriorly of the mold cavity by a spring or clip 74. The nature of this clip is such that it will hold the chain tight throughout the hardening of the molten material at which time the clamp 74 may be removed since the chain will already be fixed in position. Once again the tautness of the chain will serve to align all four of the cavity inserts which go to make up the longitudinal channel through which the chain passes. Again it will be observed that the specific bead 73 which is positioned right at the entrance of the longitudinal channel into the mold cavity will be the one that acts as the stop to the flow of the molten material and this bead will therefore remain exteriorly of the molded segment of the finished product. In the case of all of the insert blocks having the longitudinal channel such as would be formed by the half-round grooves 61 and 62 in FIGURE 3, individual beads such as 77 in FIGURE 7 may be positioned in the channel adjacent its opening into the cavity so as to limit the flow of the molten material therefrom. Where these beads are thus individually positioned in the channel, they may simply be removed upon the opening of the mold, having already performed their desired function.

Once the mold is assembled and closed as shown in FIGURE 1, the molten metal is introduced therein and allowed to harden whereupon the assembly is opened to produce the finished products such as shown in FIG- URES 7 and 8. While the mold is in closed position, its lower end view is as shown in FIGURE 6 wherein it can be seen that the hinge 13 provides a broad base upon which the mold can be stood in erect position to receive the pouring. The hinge plate 13a is shown to have appropriately located openings therein to register with the heads of the adjustment screws 32, 32a 33 and 33a for the adjustment bars 24 and 25. Because of this exposure, the adjustment bars may be precisely positioned even while the mold is in its closed position. Referring again to the hinge plate 13a in FIGURE 2, it will be observed that it may be formed with a slight curvature which, when the plate is formed of a tempered or spring steel, will tend to exert an opening pressure against the frame members when they are in closed position. The removal of the fasteners 51, 52, 53 and 54 will then tend to force the mold open to facilitate removal of the molded product.

The fishing lure shown in FIGURE 7 comprises a molded segment 75 which might have been formed in the cavity of the mold block 66a of FIGURE 4 with the wire 76 passing therethrough corresponding to the wire 70 in FIGURE 4. The bead 77a at the top of the lure might be the bead at the end of the bead chain 71 in FIGURE 4, whereas the bead 77 could have been independently associated with the wire either during or subsequent to the molding operation. With the free end of the wire may also then be associated such conventional luring devices as the spoon or spinner 78. So also the sinker of FIGURE 8 might have been formed in the cavity depressions of the blocks 68, 68a, 42 and 43 with the chain 81 having eyelets 82 corresponding to the chain 72 of FIGURE 4.

From all of the above it can be seen that there is here provided a mold assembly which can be easily manipulated to provide myriad arrangements of the individual interchangeable mold cavity members to produce an almost infinite variety of molded objects particularly suitable for use as fishing lures or weights. Not only can a particular series of mold blocks be arranged in unlimited varieties of groupings of four, but also the devotee may acquire plain insert members which he can use as spacers or in which he can carve or machine his own new designs for cavities which may then themselves be used in conjunction with an infinite number of other cavity members. At the same time, the accommodating nature of the mold assembly here provided is such that the series of quarter-segment cavity blocks can be replaced on each frame by a single cavity block, the planar dimensions of which correspond to the planar dimensions of the aggregate of the quarter-segment blocks so that a single, large cavity mold will be provided. So also may a half-cavity segment equal in width to two, three or any multiple of the individual quarter-cavity units be employed along with the quarter-cavity units.

Whereas multiple-unit mold assemblies in the past have required particular skill and considerable time in the necessary arrangement and alignment of the cavity forming members, the assembly of this invention makes it possible for even the most inexperienced person to achieve quality results. Playing perhaps the most important part in this feature are the adjustment bars such as 24 and 23 which, because they are already held against the frame members do not tend to buckle or tilt as the individual cavity members have been wont to do. Moreover, as these adjustment bars are tightened by manipulation of the adjustment screws such as 32 and 33 they provide a uniform locking pressure throughout the entire length of the cavity forming members so that they are not only held firmly against each other and against the respective faces of the frame members with which they are associated but are also held in proper position to meet and register with their counterparts on the opposite frame member with reasonable adjustable accuracy. Where, as shown in FIGURES 2 and 6, the adjustment bars may be adjusted by manipulation of the set screws 32, 33, 32a and 33a through the openings in the hinge plate, the mold with the various cavity insert members aligned as shown in FIGURE 4 may be closed to bring all of the quarter-cavity members into proper relationship under the influence of alignment means such as the rod 70 or the bead chain 72 in the channel formed by grooves such as 61 and 62. Thereafter the set screws may be tightened to urge the adjustment bars into clamping engagement with the inserts while they are thus aligned, following which the fasteners such as 26 and 27 through the frame member may then be tightened with the result that all of the cavity insert members will be finally locked in position in the precise alignment that is necessary for a quality product.

While the present invention has been described in considerable detail in connection with certain preferred embodiments thereof, it is to be understood that the foregoing particularization and detail have been for the purposes of illustration only and do not limit the scope of the invention as it is defined in the subjoined claims.

I claim:

1. A molding apparatus comprising a book frame of two leaves connected at one end of each by a hinge assembly, a pair of lugs affixed to and projecting inwardly from the opposed inner faces of each of said leaves at similarly spaced points longitudinally thereof, releasable means for holding said leaves with the lugs of each in contact with the lugs of the other whereby the opposed inner faces of said leaves and the opposed surfaces of said lugs enclose four sides of a space open along the edges of said book frame, a plurality of removable, interchangeable and reusable cavity-forming insert blocks each having a quarter-mold-cavity-forming depression opening upon one planar surface thereof and upon a surface perpendicularly disposed to said planar surface, all of said blocks being of the same cross sectional dimensions whereby they may be interchangeably paired in side-by-side, half-cavity forming, abutting relation transversely of the inner face of each of said leaves at one position relative to the length of the leaves, and whereby the mold cavity depressions of at least four of said blocks thus arranged will be in registry to define a complete mold cavity, the shape of which may be changed by interchanging said blocks within the four or with other such blocks which are also positioned in side-by-side relation against the inner face of said leaves and which completely occupy the remaining space between said lugs.

2. A molding apparatus according to claim 1 wherein abutment means are associated with at least one of said leaves along an edge of the inner face thereof between said lugs against which the blocks positioned against said face adjacent said edge abut and are thereby aligned.

3. A molding apparatus according to claim 2 wherein said abutment means comprise a strip removably associated with the edge of said leaf.

4. A molding apparatus according to claim 3 wherein said strip is affixed to the edge of said leaf by threaded fastening means passing through openings in said strip which are elongated in the direction normal to the inner face of said leaf.

5. A molding apparatus according to claim 1 wherein that planar surface of each of said blocks upon which a cavity depression opens and which is in registering abutment with a comparable block similarly positioned on the other leaf of said frame has a groove extending transversely of said surface and opening upon the mold cavity depression therein and the edges thereof whereby, when said blocks are held in side-by-side relation within said frame and said frame is closed to bring the mold cavity forming surfaces of the blocks in each of said leaves into mold cavity defining contact, all of said cavities will be inter-connected by the channel formed by said grooves.

6. A molding apparatus according to claim 5 wherein the lug at one end of each of said leaves is provided with a sprue-forming depression whereby, upon closure of the frame, a sprue passage will be formed in registry with and open to said channel.

7. A molding apparatus comprising two frame members, each having a planar surface with a transversely extending inwardly projecting lug near each end thereof, releasable means for holding said frames with the lugs of each in contact with the lugs of the other whereby the opposed inner faces of said frames and the opposed surfaces of the lugs at each end of said frames enclose four sides of a space open along the edges of said frame members between the lugs thereon, adjustable means associated with each of said frame members at the inner face thereof adjacent one of said lugs for determining the dimension of said space along the length of said frame members, and a plurality of inserts having a cavity depression opening upon the inwardly disposed surface thereof in side-by-side relation positioned against the inner faces of said frame members between said lugs and completely occupying the space between said lugs and said adjustable means.

8. A molding apparatus according to claim 7 wherein said adjustable means comprise a bar coextensive with and adjacent to said lug, the bar being affixed to said frame member by headed fastening means passing through said frame and threadably engaging openings in said bar.

9. A molding apparatus according to claim 8 wherein the openings in said frame member through which said headed fastening means pass are elongated in the direction of the length of said frame member between said lugs whereby said bar may be slid toward or away from the lug to which it is adjacent.

10. A molding apparatus according to claim 9 wherein the position of said bar relative to the lug adjacent which it is positioned is controlled by set screws passing through the projection of said lug longitudinally of said frame member.

11. A molding apparatus according to claim 10 wherein the surface of said inserts upon which the cavity depression opens is further characterized by a semi-circular groove longitudinally thereof and opening upon the cavity and the ends of said insert whereby when the mold is in closed position bores aligned longitudinally of said inserts will open upon the ends thereof whereby alignment means may be positioned in said bores and align cavity inserts as to any single cavity unit.

12. A molding apparatus according to claim 11 wherein said alignment means comprise a linear member having an outside diameter equal to the inside diameter of said bores.

13. A molding apparatus according to claim 11 wherein a head chain having an outside diameter substantially equal to the inside diameter of said bores is positioned in each of said bores adjacent each of the openings thereof upon the cavities.

14. A molding apparatus according to claim 7 wherein the releasable means for holding said frame members together comprise a hinge assembly affixed to each of said frames at one end thereof and threaded fastening means associated with the other end of said frames.

15. A molding apparatus according to claim 14 wherein said hinge assembly comprises a hinge plate having hinge pins along two edges thereof corresponding to the outer edges of the ends of said frame members whereby said hinge assembly provides a pedestal for the mold when it is in closed position.

16. A molding apparatus according to claim 15 wherein said hinge plate is curved about an axis parallel to said hinge pins and in a direction away from the ends of said frame members with which they are associated whereby said hinge plate will be under spring tension when the frame members are in closed position.

17. A molding apparatus according to claim 14 wherein said bars are adjacent the lugs near the ends of said frames at which they are affixed to said hinge assembly and said set screws are in registry with openings in said hinge plate whereby said bars may be adjusted when the mold is in closed position.

References Cited by the Examiner

UNITED STATES PATENTS

| 295,262 | 3/84 | Manula | 25—59 |
| 477,231 | 6/92 | Smith | 22—130 XR |
| 1,639,262 | 8/27 | Luks et al. | 22—109 XR |
| 1,654,026 | 12/27 | Veatch | 22—113.1 |
| 2,030,726 | 2/36 | Strock et al. | 22—136 |
| 2,084,247 | 6/37 | Dockray et al. | 22—136 |
| 2,153,087 | 4/39 | Knapp | 22—136 XR |
| 2,198,634 | 4/40 | Richter | 22—203 XR |
| 2,600,559 | 6/52 | McCauley | 22—146 |

FOREIGN PATENTS

| 454,844 | 3/49 | Canada. |
| 769,024 | 6/33 | France. |

WILLIAM J. STEPHENSON, *Primary Examiner.*

MICHAEL V. BRINDISI, *Examiner.*